(12) United States Patent
Rudenko et al.

(10) Patent No.: US 12,566,593 B2
(45) Date of Patent: Mar. 3, 2026

(54) MACHINE LEARNING MODEL BASED RANKING OF GENERATED CODE

(71) Applicant: Veracode, Inc., Burlington, MA (US)

(72) Inventors: Roman Rudenko, Vienna (AT); Anna Bacher, Vienna (AT)

(73) Assignee: Veracode, Inc., Burlington, MA (US)

( * ) Notice: Subject to any disclaimer, the term of this patent is extended or adjusted under 35 U.S.C. 154(b) by 184 days.

(21) Appl. No.: 18/464,536

(22) Filed: Sep. 11, 2023

(65) Prior Publication Data

US 2025/0004729 A1 Jan. 2, 2025

Related U.S. Application Data

(60) Provisional application No. 63/523,916, filed on Jun. 28, 2023.

(51) Int. Cl.
| | |
|---|---|
| *G06F 8/41* | (2018.01) |
| *G06F 8/35* | (2018.01) |
| *G06F 8/36* | (2018.01) |
| *G06F 8/70* | (2018.01) |
| *G06F 8/30* | (2018.01) |
| *G06F 8/33* | (2018.01) |
| *G06F 8/73* | (2018.01) |

(52) U.S. Cl.
CPC .................. *G06F 8/35* (2013.01); *G06F 8/30* (2013.01); *G06F 8/33* (2013.01); *G06F 8/70* (2013.01); *G06F 8/73* (2013.01)

(58) Field of Classification Search
CPC ..... G06F 8/35; G06F 8/30; G06F 8/33; G06F 8/73; G06F 8/42; G06F 8/36; G06F 8/70;

G06F 8/71; G06F 11/3604; G06F 11/3684; G06F 11/3688; G06F 11/3692; G06F 11/3636
See application file for complete search history.

(56) References Cited

U.S. PATENT DOCUMENTS

| | | | |
|---|---|---|---|
| 10,360,023 B2 | 7/2019 | Cowan et al. | |
| 10,635,519 B1 | 4/2020 | Tang et al. | |
| 11,645,188 B1 * | 5/2023 | Azad ........................ | G06F 8/70 717/126 |
| 2005/0223363 A1 | 10/2005 | Black-Ziegelbein et al. | |
| 2005/0278588 A1 | 12/2005 | Cohn et al. | |
| 2011/0219360 A1 | 9/2011 | Srinivasa et al. | |

(Continued)

OTHER PUBLICATIONS

Chao Liu et al., Improving ChatGPT Prompt for Code Generation, May 15, 2023, [Retrieved on Aug. 27, 2025]. Retrieved from the internet: <URL: https://arxiv.org/pdf/2305.08360> 12 Pages (1-12) (Year: 2023).*

(Continued)

*Primary Examiner* — Anibal Riveracruz
(74) *Attorney, Agent, or Firm* — Gilliam IP PLLC

(57) ABSTRACT

A generative AI based pipeline has been created that ranks generated responses that are candidate software patches. The ranking is based on predicted quality measures of code fragments within a corresponding prompt to a generated AI model. The predicted quality measures are generated by a machine learning model that has been trained based on features that are values/measures of similarity metrics between code fragments, between code fragment changes, between code structures, and/or between changes of code structures.

23 Claims, 8 Drawing Sheets

CREATE TRAINING DATASET FOR FINE-TUNING PRE-TRAINED CODE LARGE LANGUAGE MODEL (LLM) TO OUTPUT CODE MODIFICATIONS AS RESPONSES

201 — OBTAIN CODE BEFORE AND AFTER SUBMITTED CODE CHANGES ("COMMITS") FROM CODE REPOSITORIES ACROSS TARGET PROGRAMMING LANGUAGES

203 — PAIR COMMITS BASED ON CHANGE SIMILARITY

205 — FOR EACH PAIR OF COMMITS

207 — FORM TRAINING EXAMPLE (PROMPT AND RESPONSE), THE PROMPT FORMED FROM PRE-CHANGE CODE OF FIRST COMMIT, PRE-CHANGE CODE OF SECOND COMMIT, AND POST-CHANGE CODE OF SECOND COMMIT WITH MARKERS INSERTED AND INDICATE POST-CHANGE CODE OF FIRST COMMIT AS EXPECTED RESPONSE

213 — ADDITIONAL PAIRED COMMITS?
YES
NO

214 — FORM TRAINING EXAMPLES FROM SYNTHETIC CODE MODIFICATIONS

215 — GENERATE QUALITY METRICS VALUES FOR TRAINING EXAMPLES AND FILTER ACCORDING TO INCLUSION CRITERION

217 — INSERT FILTERED TRAINING EXAMPLES INTO TRAINING DATASET

END

(56)  References Cited

U.S. PATENT DOCUMENTS

| | | | |
|---|---|---|---|
| 2017/0212829 A1 | 7/2017 | Bales et al. | |
| 2019/0138731 A1 | 5/2019 | Tan et al. | |
| 2020/0097389 A1 | 3/2020 | Smith et al. | |
| 2021/0064515 A1 | 3/2021 | Xu et al. | |
| 2022/0366352 A1* | 11/2022 | Matsuoka | G06Q 30/0631 |
| 2024/0004623 A1* | 1/2024 | Groenewegen | G06F 8/42 |
| 2024/0020116 A1* | 1/2024 | Chen | G06N 3/08 |
| 2024/0402999 A1* | 12/2024 | Chen | G06F 8/33 |

OTHER PUBLICATIONS

U.S. Appl. No. 18/464,436, Non-Final Office Action mailed Nov. 24, 2023, 28 pages.
U.S. Appl. No. 18/464,436, Notice of Allowance mailed Sep. 11, 2024, 16 pages.
Burges, et al., "Learning to Rank with Nonsmooth Cost Functions", NIPS'06: Proceedings of the 19th International Conference on Neural Information Processing Systems, Dec. 4, 2006, pp. 193-200.
Li, et al., "StarCoder: May the Source be With You!", arXiv:2305.06161v1, May 9, 2023, 54 pages.
Von Werra, et al., "StarCoder: A State-of-the-Art LLM for Code", [online], [retrieved on Jul. 15, 2023] Retrieved from the Internet: <https://huggingface.co/blog/starcoder>, May 4, 2023, 7 pages.
EP Application No. 24180318.8, Extended European Search Report, 13 pages.
Jin, et al., "InterFix: End-to-End Program Repair with LLMs", arXiv:2303.07263v1 [cs.SE] Mar. 13, 2023, 11 pages.

* cited by examiner

FIG. 1

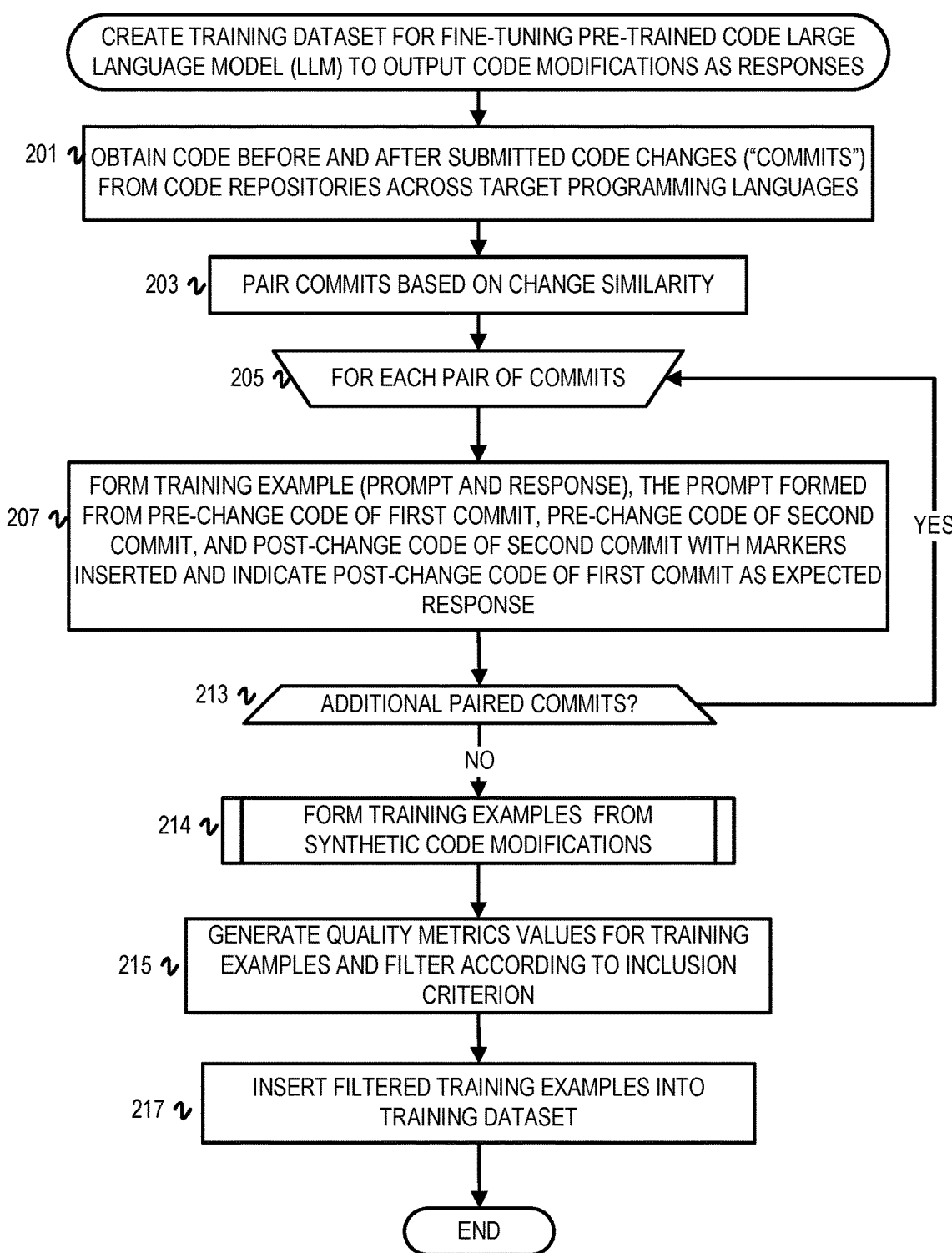

CREATE TRAINING DATASET FOR FINE-TUNING PRE-TRAINED CODE LARGE LANGUAGE MODEL (LLM) TO OUTPUT CODE MODIFICATIONS AS RESPONSES

201   OBTAIN CODE BEFORE AND AFTER SUBMITTED CODE CHANGES ("COMMITS") FROM CODE REPOSITORIES ACROSS TARGET PROGRAMMING LANGUAGES

203   PAIR COMMITS BASED ON CHANGE SIMILARITY

205   FOR EACH PAIR OF COMMITS

207   FORM TRAINING EXAMPLE (PROMPT AND RESPONSE), THE PROMPT FORMED FROM PRE-CHANGE CODE OF FIRST COMMIT, PRE-CHANGE CODE OF SECOND COMMIT, AND POST-CHANGE CODE OF SECOND COMMIT WITH MARKERS INSERTED AND INDICATE POST-CHANGE CODE OF FIRST COMMIT AS EXPECTED RESPONSE

YES

213   ADDITIONAL PAIRED COMMITS?

NO

214   FORM TRAINING EXAMPLES FROM SYNTHETIC CODE MODIFICATIONS

215   GENERATE QUALITY METRICS VALUES FOR TRAINING EXAMPLES AND FILTER ACCORDING TO INCLUSION CRITERION

217   INSERT FILTERED TRAINING EXAMPLES INTO TRAINING DATASET

END

FIG. 2

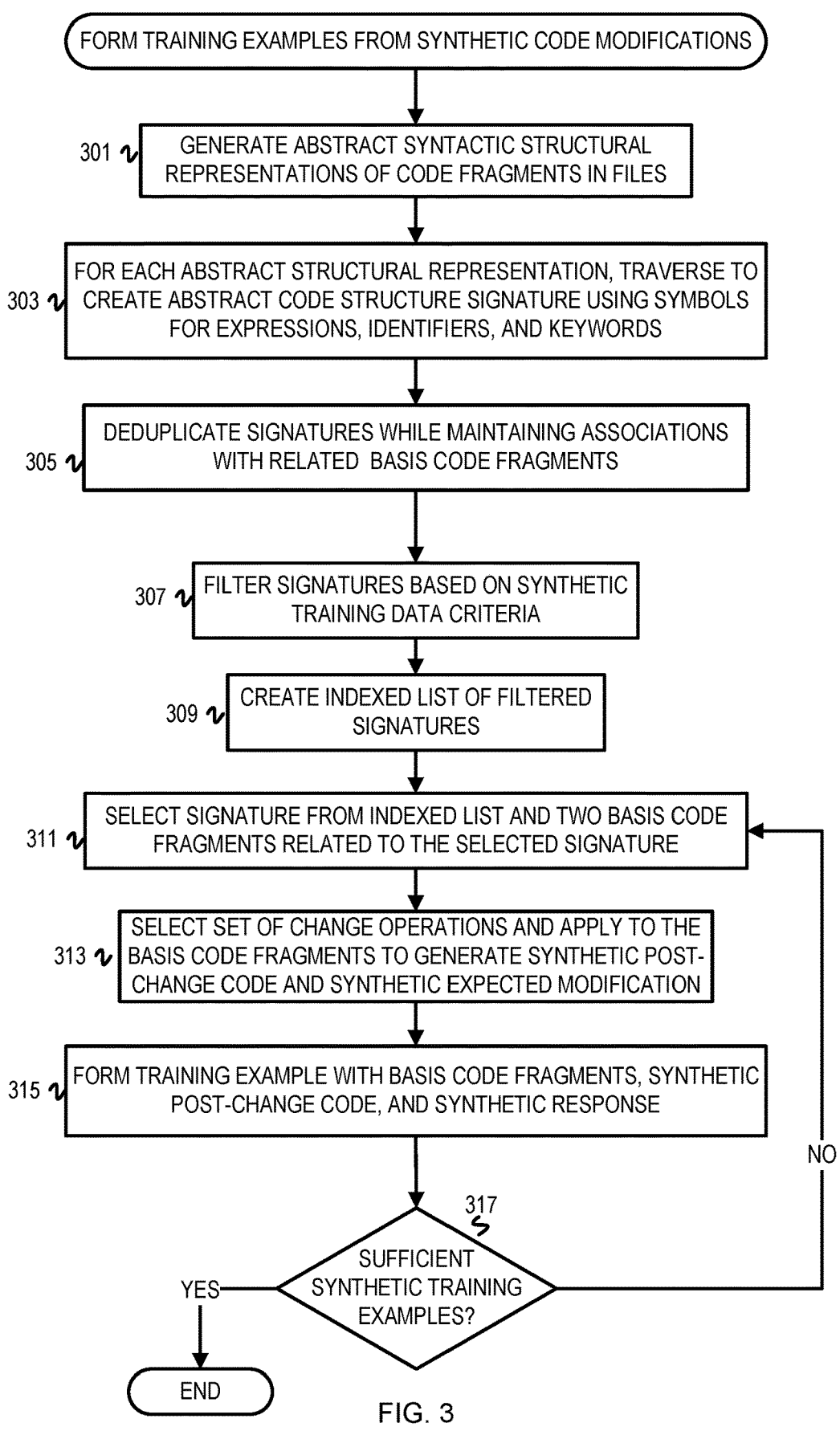

FORM TRAINING EXAMPLES FROM SYNTHETIC CODE MODIFICATIONS

301　GENERATE ABSTRACT SYNTACTIC STRUCTURAL REPRESENTATIONS OF CODE FRAGMENTS IN FILES

303　FOR EACH ABSTRACT STRUCTURAL REPRESENTATION, TRAVERSE TO CREATE ABSTRACT CODE STRUCTURE SIGNATURE USING SYMBOLS FOR EXPRESSIONS, IDENTIFIERS, AND KEYWORDS

305　DEDUPLICATE SIGNATURES WHILE MAINTAINING ASSOCIATIONS WITH RELATED BASIS CODE FRAGMENTS

307　FILTER SIGNATURES BASED ON SYNTHETIC TRAINING DATA CRITERIA

309　CREATE INDEXED LIST OF FILTERED SIGNATURES

311　SELECT SIGNATURE FROM INDEXED LIST AND TWO BASIS CODE FRAGMENTS RELATED TO THE SELECTED SIGNATURE

313　SELECT SET OF CHANGE OPERATIONS AND APPLY TO THE BASIS CODE FRAGMENTS TO GENERATE SYNTHETIC POST-CHANGE CODE AND SYNTHETIC EXPECTED MODIFICATION

315　FORM TRAINING EXAMPLE WITH BASIS CODE FRAGMENTS, SYNTHETIC POST-CHANGE CODE, AND SYNTHETIC RESPONSE

317　SUFFICIENT SYNTHETIC TRAINING EXAMPLES?

NO

YES

END

FIG. 3

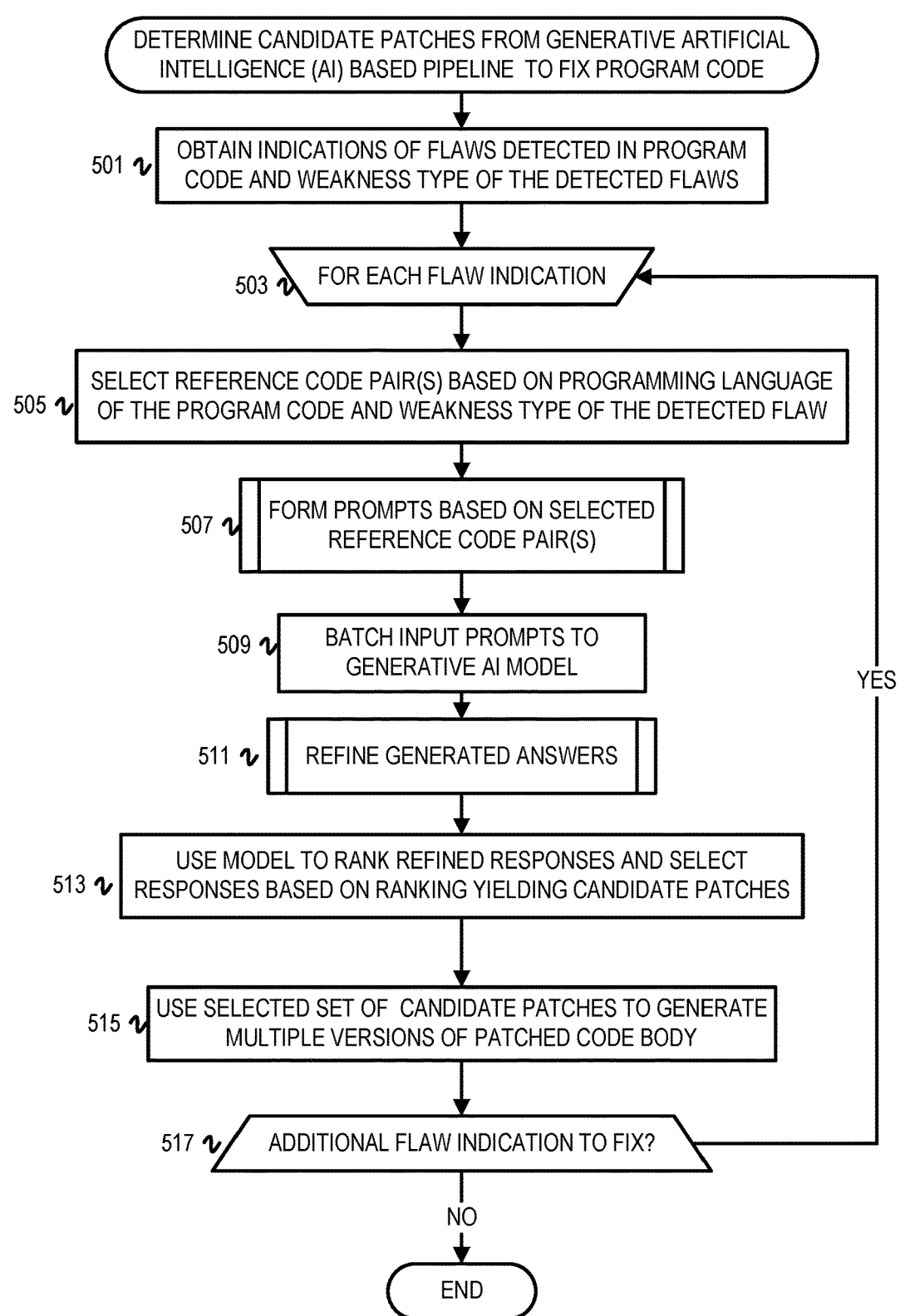

DETERMINE CANDIDATE PATCHES FROM GENERATIVE ARTIFICIAL INTELLIGENCE (AI) BASED PIPELINE TO FIX PROGRAM CODE

501 — OBTAIN INDICATIONS OF FLAWS DETECTED IN PROGRAM CODE AND WEAKNESS TYPE OF THE DETECTED FLAWS

503 — FOR EACH FLAW INDICATION

505 — SELECT REFERENCE CODE PAIR(S) BASED ON PROGRAMMING LANGUAGE OF THE PROGRAM CODE AND WEAKNESS TYPE OF THE DETECTED FLAW

507 — FORM PROMPTS BASED ON SELECTED REFERENCE CODE PAIR(S)

509 — BATCH INPUT PROMPTS TO GENERATIVE AI MODEL

511 — REFINE GENERATED ANSWERS

513 — USE MODEL TO RANK REFINED RESPONSES AND SELECT RESPONSES BASED ON RANKING YIELDING CANDIDATE PATCHES

515 — USE SELECTED SET OF CANDIDATE PATCHES TO GENERATE MULTIPLE VERSIONS OF PATCHED CODE BODY

517 — ADDITIONAL FLAW INDICATION TO FIX?

YES

NO

END

FIG. 5

MACHINE LEARNING MODEL BASED RANKING OF GENERATED CODE

BACKGROUND

The disclosure generally relates to computing arrangements based on specific computational models (e.g., CPC G06N) and security arrangements for protecting programs (e.g., CPC G06F 21/00).

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large scale language models ("LLMs") are based on the Transformer architecture. With Transformer-based LLMs, the meaning of model training has expanded to encompass pre-training and fine-tuning. In pre-training, the LLM is trained on a large training dataset for the general task of generating an output sequence based on predicting a next sequence of tokens. In fine-tuning, various techniques are used to fine tune the training of the pre-trained LLM to a particular task. For instance, a training dataset of examples that pair prompts and responses/predictions are input into a pre-trained LLM to fine tune it.

BRIEF DESCRIPTION OF THE DRAWINGS

Embodiments of the disclosure may be better understood by referencing the accompanying drawings.

FIG. 1 is a diagram illustrating a code fixing pipeline that uses generative AI to generate code modifications to fix a flaw in a program code.

FIG. 2 is a flowchart of example operations for creating a training dataset for fine-tuning a pre-trained LLM to generate code modifications as responses.

FIG. 3 is a flowchart of example operations for forming training examples from synthetic code modifications.

FIG. 5 is a flowchart of example operations for determining candidate patches from a generative AI based pipeline to fix program code.

DESCRIPTION

Figure 4:
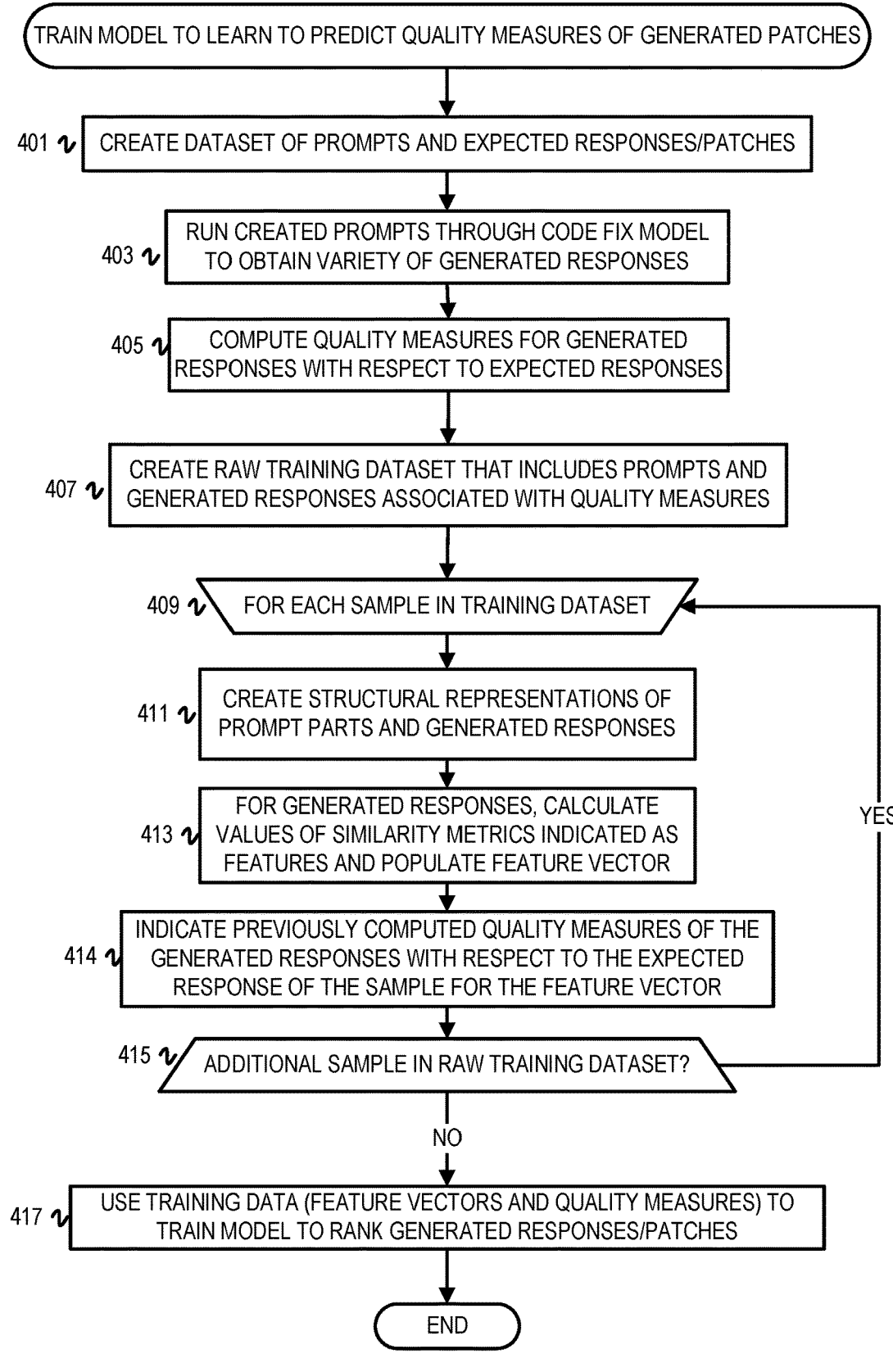
FIG. 4 is a flowchart of example operations for training a model to learn to predict quality measures of generated responses/patches from a LLM to facilitate selection of the responses.

The description that follows includes example systems, methods, techniques, and program flows to aid in understanding the disclosure and not to limit claim scope. Wellknown instruction instances, protocols, structures, and techniques have not been shown in detail for conciseness.

Terminology

The description uses the term "commit" in an both its formal meaning and colloquial meaning in the software version control context. Within a software version control system, commit refers to the operation of including changes (e.g., staged files with changes) into a head/primary directory/folder of a development project.

Colloquially, "commit" is sometimes used to refer to the aggregate of code before modification and corresponding code after modification.

The description uses the term "pipeline" to refer to a set of processing elements (e.g., a software tool, application, process, thread, etc.) arranged in sequence to receive input from a preceding element and output to a next element.

The description uses the term "code body" to refer to a logical grouping of program code (e.g., statements) that performs a task or tasks within a sub-routine, which can be a method, procedure, function, etc. depending upon a platform and/or programming language. As an example, a code body of a function would be the program code within the curly brackets of the function definition and does not include the header (i.e., function name and arguments). A code body can be nested within another code body. The term code body is used instead of block or region to avoid confusing overload of those terms which already have specific meanings in software development environments.

The description uses the term "code fragment" to refer to a small unit of program code, such as a line of code or a few lines of code. In a programming context, the term code fragment can refer to a small, reusable piece of code (e.g., a statement or part of a statement). For this description, a code fragment is not necessarily a reusable piece of code and broadly refers to a small part of a program code.

The description also uses the terms flaw, vulnerability, and both patch and patching. A "flaw" refers to a weakness, defect, or imperfection in software, hardware, or a service component. A "vulnerability" is a flaw that can be exploited for a cyberattack. NIST Computer Security Resource Center (CSRC) glossary defines patching as "The act of applying a change to installed software—such as firmware, operating systems, or applications—that corrects security or functionality problems or adds new capabilities." This description uses the term patch and patching with a broader meaning than given in the CSRC glossary. The term "patch" refers to a change or set of changes to a piece of program code to fix or improve a flaw in the program code, not necessarily installed software. "Patching" refers to applying a patch or the act of making the change(s).

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

A generative artificial intelligence (AI) driven code fixing pipeline has been created that uses a transformer-based LLM to patch flawed program code. A pre-trained transformer-based LLM (e.g., a generative pre-trained transformer (GPT) model) is fine-tuned to generate a token sequence or response that is a modified version of a code fragment in a prompt to the LLM. For fine-tuning, a training dataset of examples is created with prompts and expected responses for the task of code modification. Each prompt of an example includes multiple parts. The prompt parts include a code body, a code fragment within the code body to modify ("to-modify fragment"), and a reference code pair. The reference code pair includes a code fragment prior to a modification ("pre-change reference code") and a code fragment after the modification ("post-change reference code"). The pre-change and post change reference codes also include contextual code. An expected response paired with a prompt in an example is an expected modification of the to-modify fragment in the prompt. In addition, each prompt includes markers to distinguish the constituent parts. The markers facilitate the LLM learning to constrain a generated response to be a modification of the to-modify code fragment and learning context from the code body proximate to (e.g., surrounding or preceding) the to-modify fragment. The markers also indicate the pre- and post-change reference codes which together provide hints or clues for the attention mechanisms of the LLM.

After fine-tuning, the LLM (hereinafter "code fix model") is integrated into a pipeline that includes a program code cybersecurity scanner, a prompt generator, the code fix model, and a refiner. The code cybersecurity scanner generates indications of flaws in program code and weakness types for those flaws. These indications flow into the prompt generator. The prompt generator retrieves reference code pairs based on weakness type and programming language to generate a batch of prompts for the code fix model. Unlike the reference code pairs used during fine-tuning which allow an LLM to learn general code modifications, the reference code pairs for a deployed code fix model are reference patch code pairs. The code fix model responses to the prompts are code modifications/candidate patches which flow into the refiner. The refiner can include filters and algorithms for refining the candidate patches. A filter can be applied to remove syntactically incorrect candidate patches. The refiner can also insert a candidate patch that is derived from another candidate patch. The refiner includes a trained ranking model used to rank the candidate patches. The refiner then selects candidate patches based on the ranking and applies each to the corresponding flawed code fragment and presents the different patched versions of the flawed fragment for selection.

A challenge with using generative AI to generate code that can take various forms is balancing between generating numerous alternatives/options and overwhelming a user responsible for choosing among the alternatives. In terms of generative artificial intelligence (AI) technology, ranking generated responses assists in the balance between generating multiple responses to increase robustness of the generated responses and having a manageable set of alternatives. A generative AI based pipeline has been created that ranks generated responses that are candidate software patches. The ranking is based on predicted quality measures of code fragments within a corresponding prompt to a generated AI model. The predicted quality measures are generated by a machine learning model that has been trained based on features that are values/measures of similarity metrics between code fragments, between code fragment changes, between code structures, and/or between changes of code.

Example Illustrations

Figure 1:
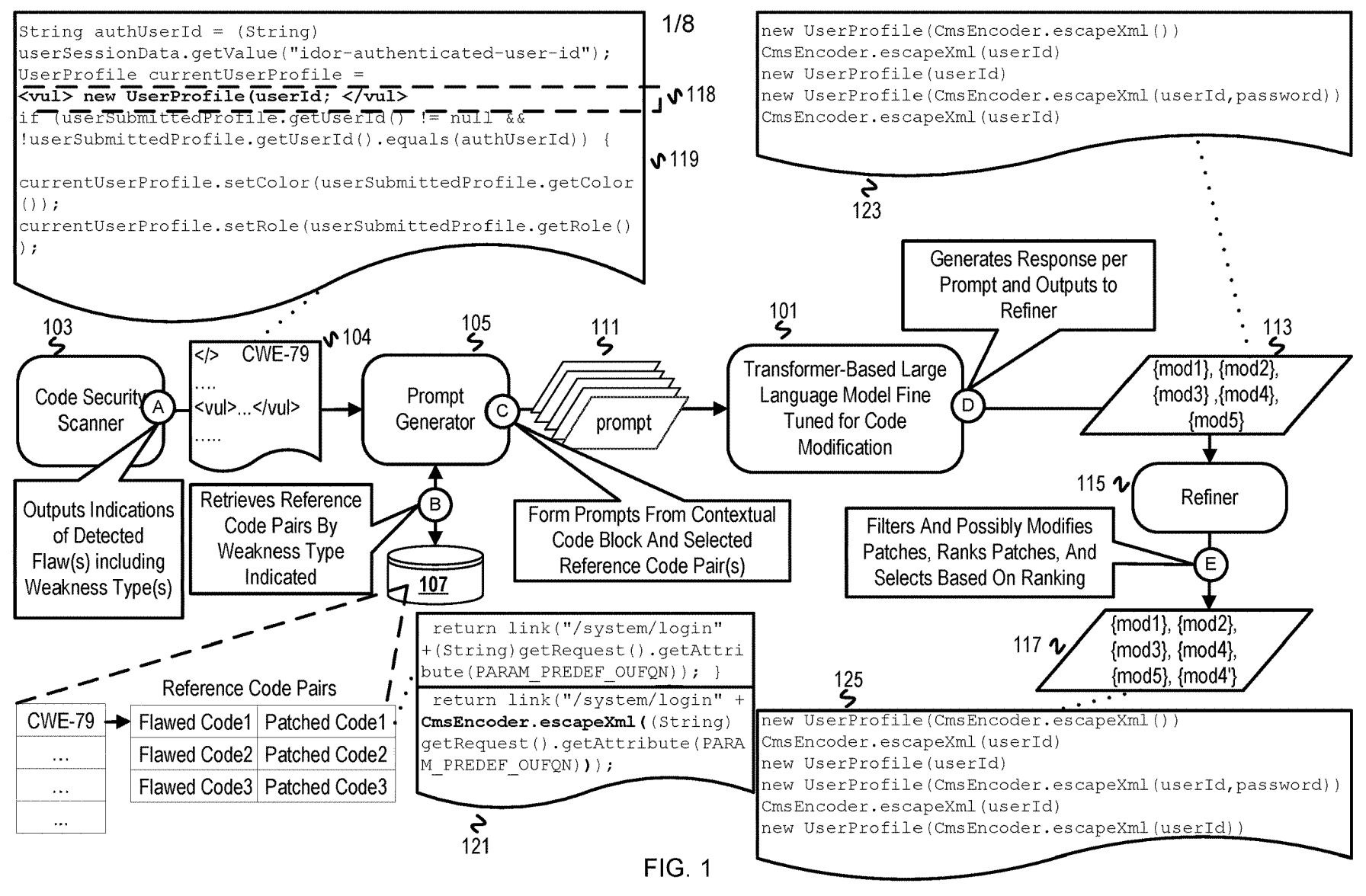

FIG. 1 is a diagram illustrating a code fixing pipeline that uses generative AI to generate code modifications to fix a flaw in a program code. The pipeline includes a code security scanner 103, prompt generator 105, a transformer-based LLM 101, and a refiner 115. The illustrated pipeline ultimately outputs refined code modifications to fix a flaw found in a program code that includes a code body 119. The prompt generator 105 generates a batch of prompts 111 which is input to the LLM 101. The LLM 101 has been fine tuned to generate responses that are code modifications. Embodiments can include an additional processing element that selects one of the patches and applies the selected patch to the program code. FIG. 1 includes example code fragments to aid in the description.

FIG. 1 is annotated with a series of letters A-E, each of which represents stages of one or more operations. Although these stages are ordered for this example, the stages illustrate one example to aid in understanding this disclosure and should not be used to limit the claims. Subject matter falling within the scope of the claims can vary from what is illustrated.

At stage A, the code security scanner 103 outputs to the prompt generator 105 an indication 104 of a detected flaw(s) including a corresponding weakness type(s). While scanning a file(s) of an application, the scanner 103 detected a flaw at a location within the code body 119, which will be referred to as flawed code fragment 118. In addition to weakness type, the indication 104 indicates the location of the flawed code fragment 118 (e.g., line number). The weakness type is indicated as CWE-79 Improper Neutralization of Input During Web page Generation (Cross-site Scripting) for this illustration.

At stage B, the prompt generator 105 retrieves one or more reference code pairs based on the indicated weakness type, CWE-79. A repository 107 hosts one or more pairs of reference code pairs per weakness type. A reference code pair is a pair of code units or code fragments that correspond to each other: a first code fragment that includes contextual code and flawed code ("flawed reference code") and a second code fragment that is a patched version of the first code fragment and includes the same contextual code ("patched reference code"). The contextual code included in the fragments of the reference code pair may be a line or a few lines of program code prior to and possibly subsequent to the flawed code and patched code. Contextual code is not limited to a line granularity and can be code preceding and/or subsequent to the flaw/patch on a same line. Different weakness types can have different numbers of reference code pairs. In addition, either of the flawed reference code and the patched reference code can recur in different reference code pairs. For this illustration, a reference code pair associated with CWE-79 includes multiple reference code pairs. A first reference code pair Flawed Code1 and Patched Code1 are depicted as:

```
return link ("/system/login"
+ (String) getRequest ( ) .getAttribute (PARAM_PREDEF_OUFQN)); }
and
return link ("/system/login" + CmsEncoder.escapeXml ((String)
getRequest ( ) .getAttribute (PARAM_PREDEF_OUFQN)));
```

The reference fix Patched Code1 is depicted with the modification in bold.

At stage C, the prompt generator 105 forms prompts 111 from the code body 119 and the retrieved one or more reference code pairs. In forming a prompt, the prompt generator 105 inserts markers to delineate the code body 119, the flawed fragment 118, a flawed reference code, and a patched reference code. Each prompt includes the code body 119 because it provides the LLM 101 context for the flawed code fragment 118 but the LLM 101 has learned to constrain modification to the flawed code fragment 118. In LLM terms, the LLM 101 has learned to predict a token sequence that continues from the context code or a token sequence that does not change the context code (i.e., constrained to generating a response that is a modification of the code within flaw markers). In FIG. 1, markers <vul> and </vul> are used to mark the flawed code fragment 118 and constrain modification to the code fragment 118. These are the same as those in the indication 104 for simplicity of the illustration. The markers for delineating a flawed code fragment in a prompt for the LLM 101 are likely developed independently from the indicators employed by the scanner 103 to indicate location of a detected flaw. Moreover, implementations can use other markers that will be treated as special tokens by the LLM 101. In other words, markers are chosen to avoid conflict/overload with program code tokens. To generate the batch of prompts 111 in this illustration, the prompt generator 111 forms a prompt corresponding to each retrieved reference code pair. Assuming the LLM 101 has been configured to generate n responses for each prompt and the prompt generator 105 has been configured to generate m prompts, the total number of generated responses before any filtering or refining will be n*m.

At stage D, the LLM 101 generates a response/modification per prompt and outputs modifications 113 to the refiner 115. Generally, the output of a prompt driven LLM is referred to as completion, prediction, or response. However, the LLM 101 has been fine-tuned to generate a predicted token sequence that will be used as a code modification. Thus, the responses are referred to as code modifications or patches of a flawed code fragment indicated in a prompt. In this illustration, the LLM 101 outputs 5 modifications for a single prompt, but space limitations prevent the depiction of 23 example modifications from 5 prompts. Responses 123 for the code modifications 113 are the following:

```
new UserProfile (CmsEncoder.escapeXml ( ))
CmsEncoder.escapeXml (userId)
new UserProfile (userId)
new UserProfile (CmsEncoder.escapeXml (userId, password))
CmsEncoder.escapeXml (userId)
```

Implementations are likely configured to generate more modifications (e.g., 3 prompts per detected flaw/vulnerability and 12 responses/modifications per prompt).

At stage E, the refiner 115 filters and possibly modifies one or more of the code modifications in the responses 113. After filtering and/or modifying the generated modifications in the responses 113, the refiner 115 ranks the resulting modifications and selects a modification as a patch to apply to the program code. Filtering removes syntactically incorrect code modifications. Further modification of the pool of code modifications introduces alternatives that may rank higher. In this illustration, the refining by the refiner 115 yields a pool of 6 code modifications:

```
new UserProfile (CmsEncoder.escapeXml ( ))
CmsEncoder.escapeXml (userId)
new UserProfile (userId)
new UserProfile (CmsEncoder.escapeXml (userId, password))
```

-continued

```
CmsEncoder.escapeXml (userId, password)
new UserProfile (CmsEncoder.escapeXml (userId))
```

The refiner 115 has created a derivative code modification from the fourth code modification new UserProfile (CmsEncoder.escapeXml (userId, password)). After analyzing similarity of the code modifications (discussed later), the refiner 115 creates a version of the fourth code modification without password as an argument to CmsEncoder.escapeXml. After refining, the refiner 115 ranks the refined pool of code modifications with a ranking model that has been trained to rank code modifications based on similarity metrics relating to structure and change/modification. Depending upon implementation, the pipeline can output the pool of code modifications for review and selection by a developer or the pipeline can select a subset of the modifications according to the ranking and present the different modifications as candidate patches.

FIGS. 2-5 are flowcharts that relate to different aspects of the disclosed technology. The example operations are described with reference to a code fix pipeline ("pipeline") or trainer for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for creating a training dataset for fine-tuning a pre-trained LLM to generate code modifications as responses. The example operations of FIG. 2 are described with reference to a trainer. The training dataset will include examples created from pairings of code modifications collected from available submissions of code changes ("commits"), for example commits in public code repositories that grant permissions for model training. With the training dataset being examples of code modifications, the fine-tuning facilitates the LLM learning how to mimic modifying code.

At block 201, a trainer obtains code before and after submitted code changes from code repositories across target programming languages. For instance, the trainer can determine commits in a versioning system and access associated files to obtain the code before and after the commits. For brevity, this description will use "commit" to refer to code before and after a submitted change. Although the fine-tuned LLM is ultimately deployed for generating code modifications that fix flaws, the training dataset does not necessarily include flaws and fixes.

At block 203, the trainer pairs commits based on change similarity. The trainer determines similarity of changes made and then pairs based on similarity of the changes so that commits with similar changes can be used to form prompts in training examples. Determining similarity of changes can be done with a collection of metrics and comparisons. The training can compute signatures that represent structures of code and create a change signature from the structural signatures. The structure signature is generated to create an abstract representation of a code fragment that facilitates creation of a change signature without specifics such as developer's names of functions. The trainer then pairs commits based on change signature matching and/or change signature similarity. A commit can be paired with multiple other commits. The trainer can store the data used for the change comparison (e.g., edit distance between change signatures) to reuse as one element in quality measurement described later.

At block 205, the trainer begins processing each pair of commits to form at least one prompt.

At block 207, the trainer forms a training example that includes a prompt and a response based on the pair of commits. For efficiency, the following notation will be used to distinguish parts that will form the example: A for the pre-change code of a first commit of the pair of commits including the code fragment to change, D for the modified code fragment of the first commit, B for the pre-change code of a second commit of the commit pair, and C for post-change code of the second commit. The trainer also inserts markers to delineate each part. Each part includes contextual code along with the code that will change or has changed. The trainer inserts markers into A indicating the code fragment that will be changed. These markers indicate that the LLM should not modify code outside the markers. The trainer then inserts into the prompt being formed a marker after A and prior to appending B, and another marker subsequent to B and prior to C. The markers delineating B and C can be considered as hints or influences on the attention mechanisms of the LLM and indicate to the LLM that C is a sequence of tokens based on B. The ordering of A, B, and C in the prompt can vary across embodiments with a caveat that the ordering be consistent between training and inference and that the ordering of B and C may lead to better outcomes. The part D is the expected response used for evaluation of the model output based on the prompt.

At block 213, the trainer determines whether there is an additional pair of commits to process. If not, operational flow proceeds to block 215. If there is an additional pair of commits, then operational flow returns to block 205.

At block 214, the trainer forms training examples from synthetic code modifications. The trainer parses program code files, which are obtained from code repositories, to determine abstracted representations of code structures. Instances of these code structures are selected and synthetic modifications made to create code pairs to create training examples. FIG. 3 provides more detailed example operations.

FIG. 3 is a flowchart of example operations for forming training examples from synthetic code modifications. The description refers to the trainer as performing the example operations for consistency with FIG. 2. The example operations of FIG. 3 refer to code fragments in files. The files can be the same as those used to obtain the code commits (201) or overlap with those files. Or the program code files can be a separate set of files.

At block 301, the trainer generates abstract syntactic structure representations of code fragments in files. For instance, the trainer can use a parser(s) to create abstract syntax trees (ASTs). If multiple programming languages are represented in the files, then the trainer may use a different parser for each language.

At block 303, the trainer traverses each abstract syntactic structural representation to create a string representation that further abstracts the abstract syntactic structural representation. When creating the string representation or abstract code structure signature, the trainer uses a set of symbols to abstract variables/identifiers and to abstract expressions. The trainer may also use symbols for programming language keywords to create a compact string representation. As an example, the code fragment WHILE (count<10) {functionX(var2); IF (flag) BREAK could be represented with a string W(Ex){I(I); IF (I) BREAK, where a W is used as a compact symbol for the WHILE keyword and Ex and I are respectively used as symbols for expressions and identifiers. These symbols are used as placeholders to facilitate applying edit operations later. This technique for creating abstract code structure signatures can be used by the trainer when determining change similarity of commits for commit pairing discussed earlier.

At block 305, the trainer deduplicates abstract code structure signatures while maintaining associations with related abstract syntactic structural representations and basis code fragments. Since an abstract code structure signature expresses structure abstracted from an abstract syntactic structural representation, an abstract code structure signature may be related to more than one abstract syntactic structural representation. If an abstract code structure signature is related to n abstract syntactic structural representations, then the string representation will be related to n code fragments that are the basis ("basis code fragment") for the n abstract syntactic structural representations. The training can maintain a data structure that references or maps abstract code structure signatures to the basis code fragments.

At block 307, the trainer filters the abstract code structure signatures based on synthetic training data criteria. Criteria are defined to ensure quality of the examples created from synthetic code modifications to be included in a training dataset. For example, the criteria can require a string representation to satisfy a size criterion (e.g., 128-256 symbols) and a quantity of basis code fragments criterion (e.g., at least 4 basis code fragments per abstract code structure signature).

At block 309, the trainer creates an indexed list of filtered abstract code structure signatures. This can be a list of the abstract code structure signatures indexed with integers from 1 to R. The list is created to facilitate selection of abstract code structure signatures.

At block 311, the trainer selects a abstract code structure signature from the list and two basis code fragments related to the string representation. The trainer can use a pseudo-random number generator to select a value from 1 to R to randomly select from the list. Selection of the basis code fragments can also be random or deterministic (e.g., a round robin selection algorithm).

At block 313, the trainer selects a set of change operations and applies the selected set of change operations to the basis code fragments. The set of change operations are applied to the abstract code structure signature and then implemented on the basis code fragments. When applied to the abstract code structure signature to create a modified version of the abstract code structure signature, mappings of the changes (e.g., moving or copying an identifier and/or expression) are maintained to guide implementation on the basis code fragments. A set of heuristics can be maintained to ensure change operations of keywords result in valid code. Referring back to the notation for a training example, one of the basis code fragments will be used as part A and the other basis code fragment will be used as part B. The modified version of part A will be used as D ("synthetic expected modification") and the modified version of part B will be used as C ("synthetic post-change code").

At block 315, the trainer forms a training example with the basis code fragments, the synthetic post-change code, and the synthetic response. The parts will be arranged according to the designated use (A, B, C, D) and markers will be inserted accordingly.

At block 317, the trainer determines whether sufficient synthetic training examples have been created. A number of training examples T can be specified. If the paired commits yielded X training examples, then the trainer would determine whether T-X synthetic training examples have been created. If sufficient synthetic training examples have not yet been created, then operational flow returns to block 311. If sufficient synthetic training examples have been created, then operational flow ends for FIG. 3. For instance, operational flow proceeds to block 215 of FIG. 2.

The creation of training examples from synthetic modifications not only allows for additional examples to satisfy a threshold but also allows for automated curation of a training dataset. While large repositories of program code are available for mining, these repositories are not available without burdens. For instance, license compliance may be an issue when mining code repositories. Also, low quality or poisoned code may exist in publicly available code repositories. Creating synthetic code changes allows a carefully curated training dataset of code modifications to be expanded without the burdens of mining from an outside source and with substantially less labor.

Returning to FIG. 2, the trainer generates quality metrics values for the training examples and filters the training examples according to an inclusion criterion at block 215. For each training example, the trainer computes values for quality metrics that measure similarity of the parts of the prompt with respect to the expected response. The trainer then aggregates the values into a single score or rank that is compared against a threshold to determine whether the example should be included in the training dataset. Similarity can be measured based on characters or tokens and/or measured based on structure. Structural similarity can be measured with distillations of the code similar to the string representations created in FIG. 3 at block 303. Metrics related to change similarity can also be used. The description of FIG. 4 will provide more details for quality metrics used in ranking responses. Those quality metrics can be the same or similar as those used to evaluate whether to include a training example in the training dataset.

At block 217, the trainer inserts the filtered training examples into the training dataset. The training examples with aggregated quality metrics values that satisfy the inclusion criterion are stored in a repository of training examples.

FIG. 2 indicates use of training examples created from commits and from synthetic code modifications, but embodiments are not so limited. Embodiments may solely use either commits or synthetic code modifications to generate training examples. In addition, embodiments can use different combinations of non-synthetic and synthetic code changes to yield a training dataset.

While an embodiment can generate a single response/modification and apply that response/modification to code, embodiments can also generate multiple responses per prompt and can input a batch of prompts to the code fix model with the model configured to generate one or more responses per prompt. Different techniques can be employed to ascertain quality of the multiple patches to aid in selection. For instance, similarity of text, change, and/or structure between each generated response and the fixed reference code in the corresponding prompt can be used to measure quality. Embodiments can also employ a ranking model that generates a quality prediction based ranking of generated responses based on features corresponding to textual, change, and/or structural similarities of code fragments. With a trained ranking model, the multiple generated responses can be ranked according to predicted quality measures based ranking to allow the highest ranked p generated responses/patches to be selected and provide alternatives for patching a detected flaw.

FIG. 4 is a flowchart of example operations for training a model to learn to predict quality measures of generated responses/patches from a LLM to facilitate selection of the responses. The example operations of FIG. 4 are described with reference to a trainer for simplicity of the description, but is not intended to require a same program as that used to create the training dataset for fine-tuning a code LLM. The trainer of FIG. 4 is training a model (e.g., a gradient boosting machine (GBM) or Light GBM, but not limited to this kind of models) to predict a quality measure of a generated response based on similarities among the parts of the prompt and the generated response. Evaluation of the predicted quality score is with respect to a quality score calculated based on similarities among the generated response, expected response, and reference code parts of the prompt. Code similarity measurement techniques vary by computational complexity and effectiveness. Code similarity can be text-based (e.g., edit distance, Hamming distance, longest common subsequence), token-based (suffix trees, string alignment, Jaccard similarity, etc. can be applied to token sets or sequences), tree-based, and/or graph-based. The similarity measurements in the example operations of FIG. 4 use text based techniques for the code and code structures.

At block 401, a trainer creates a dataset of prompts and expected responses for training the ranking model. Each prompt will be created with a code body, flawed code fragment, and pair of reference codes. The expected response will be a patch for the flawed code fragment.

At block 403, the trainer runs the created prompts through the code fix model (i.e., the fine-tuned code LLM). The trainer runs the prompts through the code fix model to obtain a variety of generated responses per prompt according to configuration (e.g., the code fix model is configured to generate n responses per prompt). To obtain the variety of responses, the code fix model can be run with different hyperparameter settings (e.g., a temperature hyperparameter) that increases creativity and/or randomization. This should generate responses that are varying degrees of good and bad for each prompt. This variety of generated responses provides a rich dataset for higher quality training of the ranking model.

At block 405, the trainer computes quality measures of generated responses with respect to expected responses. The quality measure of a generated response is computed as an aggregate of values of metrics related to similarities of the generated responses, a corresponding expected responses, and a corresponding fixed reference code. For each generated responses, the trainer computes multiple ratios of edit distances of code changes and structural changes. In some cases, structural changes are represented as change signatures. A change signature compactly indicates differences between strings, in this case the strings being pieces of program code. A change signature can indicate the differences specific to the code ("detailed change signature") or indicate differences of structure ("abstract change signature"). Using the two pieces of code below as examples,

```
username_login
ESAPI.encoder ( ) .encode ForHTMLAttribute ( username_login )
, the change signatures would be:
detailed: +ESAPI.+encoder ( ) .+encodeForHTMLAttribute+ ( ==== +)
abstract: +W.+W ( ) .+W+ ( === +)
```

These example change signatures use "+" to indicate additions of a token and "====" for a common token. The abstract change signature is based on differences of structural representations. Embodiments are not limited to the example described technique for creating a signature. Different signature creation techniques can be used that pursue to varying extents accuracy in representation of the original code and stability in results of edit distance algorithms on the signatures. For example, case can be used to distinguish between removed and added tokens instead of (or in addition to) + and − symbols being used. Elaboration on structural representations is provided below in the description of block 411. The metrics used for similarity can use structural representations and/or change signatures. As an example of a quality measure that uses structural representations, the trainer computes a geometric mean of 3 similarities of changes:

1) ratio of the edit distances between the flawed code fragment and generated response and between the flawed code fragment and expected response (similarity measurement of the text changes from flawed code fragment to each of the generated and expected responses);

2) ratio of the edit distances between the structural representations of the flawed code fragment and expected response and between the structural representations of the flawed code fragment and generated response (similarity measurement of the structural changes from flawed code fragment to each of the generated and expected responses); and 3) ratio of the edit distances between the structural representations of the flawed reference code and fixed reference code and between the structural representations of the flawed code fragment and generated responses (similarity measurement of the structural changes between the reference codes and structural changes between the flawed code fragment and the generated response).

Using the earlier notations representing code fragments, ratio of edit distance between (A and B) and (C and D) means similarity ratio between a representation of change from A to B and a representation of change from C to D. Change signatures can be used to compute a representation of change from A to B/C to D. The Levenshtein ratio can be used to compute similarity ratio. Embodiments can aggregate similarity measurements with a technique different than geometric mean, such as arithmetic mean. Also, embodiments can use any one of the three similarity measurements alone as a quality measurement or different combinations of two of the three similarity measurements.

At block 407, the trainer creates a raw training dataset that includes the prompts and generated responses associated with quality measures. Each association of prompt, generated response, and quality measure is referred to as a sample in the training dataset. Also, some of the created dataset may be set aside as testing and/or validation data. "Creating" the raw training dataset is effectively maintaining association or correspondence among generated responses for a prompt and quality measures. Instead of a distinct operation, maintaining the association/correspondence may be implemented as part of computing the quality measures (e.g., storing the quality measure in a data structure entry for the corresponding generated response).

At block 409, the trainer begins iterating through the raw training dataset to pre-process the raw training dataset and create feature vectors for training the model. The example pre-processing operations include generation of structural representations used to compute values of similarity metrics. However, some embodiments may not use similarity metrics based on structural representations. Each sample corresponds to a prompt and the responses generated from the prompt.

At block 411, the trainer creates structural representations of prompt parts and each of the generated responses for the prompt. The trainer may also create a structural representation of context code of a flawed code fragment. A structural representation of code refers to representations of code that expresses structure without the variability of names. For example, a structural representation of code can replace names of identifiers/variables with a representative token (e.g., "W") and preserve special characters (e.g., brackets and parenthesis). This removes potential noise of edits unrelated to structure that can influence similarity metrics.

At block 413, the trainer calculates values of metrics indicated as features and populates a feature vector accordingly. The trainer calculates the feature values for each generated response per prompt. If the prompt has n generated responses, then the trainer will generate a matrix (i.e., feature vector) with n entries. These metrics are different than those used with respect to the expected responses at block 405. These metrics represent the prompt and generated response in a numerical way and don't include metrics from expected responses, because expected responses will not be available at inference time. Thus, the model learns to predict quality measures based on similarities of prompt parts and the generated response instead of similarities corresponding to the generated response and the expected response. Below is an example set of metrics using the notation of p for a task part and pa and pb for pairings of parts. A task part can be any one of the code body, the flawed code fragment, the flawed reference code, the fixed reference code, the generated or expected response, and context code. Also, the notation st-part refers to the structural representation of a part.

1) absolute length metric=length of a part 2) ratio of part length to length of removals and additions in D with respect to A 3) ratio of part length to the difference between the lengths of the reference code additions and the reference code removals 4) relative edit distance between paired parts 5) difference between an average of the combined length of paired parts and the absolute edit distance between the paired parts 6) ratio of absolute edit distance between paired parts and an incremented sum of lengths of additions and removals between a flawed code fragment and a generated patch 7) ratio of a length of a first part and length of a second part incremented by one 8) ratio of insert operations count to total length of paired parts 9) ratio of delete operations count from pa to pb to total length of pa and pb 10) ratio of replace operations from pa to pb to total length of pa and pb 11) measure of how sorted the sequence of edit operations from pa to pb is (e.g., correlation coefficient calculated for sequence of edit operations based on positions and edit operations sorted by edit operation representation, {insert, replace, delete}={1,0,−1}

12) measure of correlation of positions of edits between pa and pb (e.g., correlation coefficient calculated for positions of edit operations in pa and positions of edit operations in pb 13) measure of similarity of structural changes for flawed code fragment-->generated patch and flawed reference code-->fixed reference code (e.g., ratio of (edit distance between structural representations of flawed code fragment and generated patch) and (edit distance between structural representations of flawed reference code and fixed reference code))

14) measure of similarity of compact representation structural changes for flawed code fragment-->generated patch and for flawed reference code-->fixed reference code (e.g., ratio of (edit distance between structural representations of flawed code fragment and generated patch that disregards unchanged tokens) and (edit distance between structural representations of flawed reference code and fixed reference code that disregard common tokens that disregards unchanged tokens))

These example metrics are described with reference to part pairings. Part pairings should at least include a pairing between a fixed reference code and the generated response. Including additional part pairings among the code body, context code, reference codes, and generated response can improve the model to be used for ranking generated responses. Including pairings of st-parts can also improve the robustness of the model.

Embodiments are not required to use all of the listed metrics as features to train a model for quality prediction and not limited to these metrics. Generally, metrics that measure similarity between the generated patch and the fix reference code inform quality prediction. The additional metrics relating to relative measurements and indications can lead to a more robust model.

At block 414, the trainer indicates the previously computed quality measures (block 405) of the generated responses with respect to the expected response of the sample for the feature vector. As previously mentioned, each sample in the training dataset corresponds to a prompt, generated responses, and the expected response. The ranking model is being trained to predict the quality measures computed between the generated responses and the expected response based on the metrics of the prompt parts and the generated response. Thus, the input into the trainer would be the feature vector/matrix of metrics with the quality measures based on the expected response indicated as a target or label. Thus, the processed training data are the feature vectors generated from the raw training data and associated with the quality measures.

At block 415, the trainer determines whether there is another sample in the raw training dataset for which a feature vector should be created. If so, operational flow returns to block 409. Otherwise, operational flow proceeds to block 417.

At block 417, the trainer uses the training data to train a model to predict quality measures for generated responses. The model is referred to as a ranking model since the predicted quality measures will be used for ranking generated responses. An objective function is used, squared error loss function. However, implementations can use other functions, such as an absolute error loss function or a cross entropy loss function.

FIG. 5 is a flowchart of example operations for determining candidate patches from a generative AI based pipeline to fix program code. The example operations of FIG. 5 are described with reference to a pipeline for consistency with FIG. 1. The example operations of FIG. 5 presume multiple prompts will be submitted that will yield multiple generated patches. However, embodiments may submit a single prompt and obtain n generated response(s)/patch(es) according to configuration of the code fix model.

At block 501, a pipeline obtains indications of flaws detected in program code and weakness type(s) of the detected flaws. For instance, a scanner performs a static application security testing scan of files of an application and outputs weakness identifiers and/or descriptors of detected flaws and locations of the flaws.

At block 503, the pipeline begins processing each flaw indication. A flaw indication can be a weakness type in association with location of the flaw. In this case, the pipeline can retrieve a code body that includes the flawed code fragment from the scanned files. In some cases, a flaw indication can be a weakness type and the flawed code fragment instead of or in addition to location information.

At block 505, the pipeline selects a reference code pair(s) based on programming language of the scanned program code and the weakness type of the flaw. The pipeline accesses a repository that has code reference pairs indexed by weakness type identifiers, for example. The entry corresponding to the weakness type of the current iteration flaw can be associated with n reference code pairs. Reference code pairs can have common reference flaws. Embodiments can gather additional information to inform the selection of reference code pairs. For instance, at least a subset of weakness type identifiers may each be associated with a rule for additional analysis to inform reference code selection. As an example, a rule can be defined that requires data flow analysis (e.g., sink to source tracing) for a flaw indicated as a XSS type of vulnerability. The result of the data flow analysis may resolve to a specified set of reference code pairs or determine that a different code fragment should be modified, in which case the different code fragment (e.g., code fragment corresponding to a flaw source) would replace the current flawed code fragment or be added as another flawed code fragment to indicate in a different prompt. In addition to data flow analysis, embodiments can perform other analysis for flaw localization that adjusts (e.g., augments or decreases the flawed code fragment) or replaces the flawed code fragment. Other filtering can also be applied to the reference code pairs yielded based on programming language and weakness type (e.g., keyword based filtering).

Figure 6:
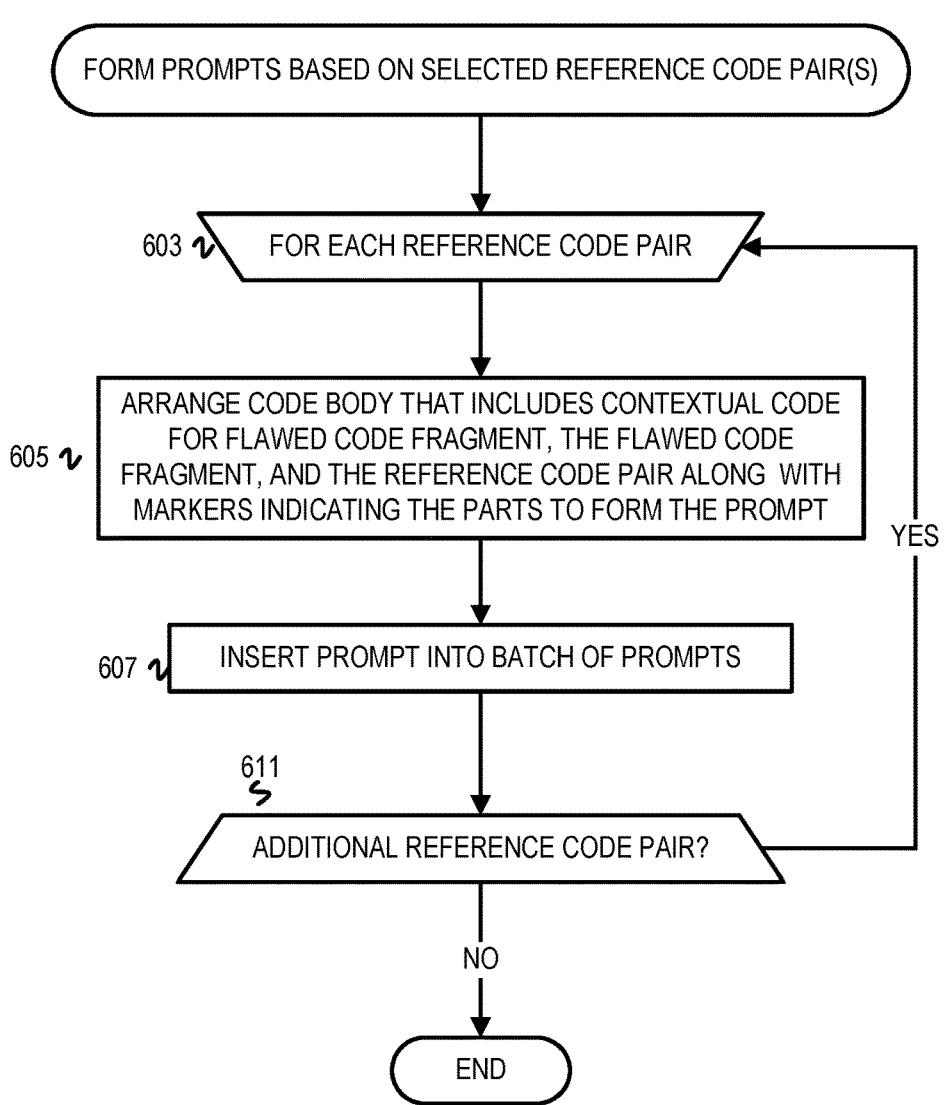
FIG. 6 is a flowchart of example operations for forming prompts based on selected reference code pair(s).

At block 507, the pipeline forms prompts based on the selected reference code pair(s). To form prompts, the pipeline arranges code fragments and markers into a prompt according to the prompt structure or arrangement used in fine-tuning. The pipeline forms enough prompts to satisfy a configured input batch size or the input batch size is based on a configured number of responses for the pipeline to generate. If forming a prompt per selected reference code pair does not satisfy the input batch size/configured responses to generate, then the pipeline replicates some of the formed prompts. FIG. 6 depicts example operations to implement block 507.

Embodiments may also form prompts and then select therefrom based on ranking of quality of the reference code pairs that constitute the prompts, effectively ranking the prompts and then selecting the p highest ranking prompts. To rank the prompts, a model would be trained to learn to predict quality measures of the reference code pairs. This would be similar to the example operations in FIG. 4 to train a model to learn to predict quality measures of generated responses/patches. However, the metrics used to generate feature vectors for ranking prompts based on predicted quality measures of reference code pairs would not be based on generated responses from the code fix model. Instead, the metrics indicate extent of changes between fragments of a reference code pair. Using the prompt part notation, the metrics for ranking prompts would be based on edit distance between B and C. Metrics indicating similarities between A and B can also be used in combination with metrics of edit distance between B and C. This will allow the model to rank prompts before the responses from the code fix model are generated. This model for ranking prompts as a function of the quality measures of reference code pairs would be separate from the model for ranking generated responses.

At block 509, the pipeline batch inputs the formed prompts to the code fix model, which is a generative AI model that has been trained to predict a token/text sequence based on the prompt, the predicted token/text sequence being a modification of the flawed code fragment. The code fix model will generate responses according to a configuration or hyperparameter that specifies responses to generate per prompt. Assuming the code fix model has been configured to generate n responses per prompt and the batch includes m prompts, the code fix model will generate m×n responses. The batch of prompts yields generated responses which this description sometimes refers to as a pool of generated candidate patches or pool of candidate patches. The candidate patches are candidates for possibly being selected to be used to fix the flaw. Having a pool of code patches increases the overall quality of code modifications. If the code fix model ranks the generated responses, the pipeline maintains associations between the responses and corresponding prompts.

At block 511, the pipeline refines the generated responses. Refinement includes eliminating incorrect responses (e.g., a response with a syntax error) and can include introduction of variations of the responses. Example operations for refining generated responses are provided with reference to FIG. 7.

At block 513, the pipeline uses a model to rank the refined responses and selects a set of refined responses based on the ranking. The pipeline includes the pre-processing functionality described with reference to FIG. 4 which generates values of similarity metrics for each response based on the response and the corresponding prompt using a maintained association between the prompts and refined responses. The trained model predicts quality measures for the responses which are used to rank the generated responses. The pipeline then selects a number of the refined responses according to the ranking and a configured selection amount. The selected, refined responses are now referred to as the selected set of candidate patches.

At block 515, the pipeline uses the selected set of candidate patches to generate multiple patched versions of the code body. This provides patching alternatives that can be chosen from to apply to the program code. For example, the pipeline generates a unified diff of each candidate patch in the selected set of candidate patches and the code body. These can be presented with or without decoration (e.g., quality measures, the prompts, etc.) and can be associated with the code body for presentation via an integrated development environment after the pipeline has produced alternative patched versions of code bodies corresponding to each of the detected flaws of an application.

At block 517, the pipeline determines whether there is an additional flaw indication. If so, operational flow returns to block 503. Otherwise, operational flow of FIG. 5 ends.

FIG. 6 is a flowchart of example operations for forming prompts based on selected reference code pair(s). The example operations will iterate through the selected reference code pairs and create a prompt per selected reference code pair.

At block 603, the pipeline begins processing each reference code pair that was selected based on the detected flaw, programming language, etc. The pipeline can iterate over a listing of the code reference pairs created from accessing the repository of reference code pairs.

At block 605, the pipeline arranges the code body that includes contextual code for the flawed code fragment, the flawed code fragment, and the reference code pair with markers indicating the parts to form the prompt. As an example, the pipeline can insert a marker that indicates the code body followed by the code body. The pipeline can then append a marker that indicates the flawed code fragment followed by the flawed code fragment. The pipeline then appends the marker for the flawed reference code and the flawed reference code followed by the marker for the fixed reference code and the fixed reference code. As previously mentioned, implementations can arrange parts and markers differently, but consistent with the arrangement used for fine-tuning.

At block 607, the pipeline inserts the formed prompt into a batch of prompts. For instance, the pipeline can maintain a queue or buffer for the prompts to be provided to the code fix model as batched input.

At block 611, the pipeline determines whether there is an additional reference code pair to use for prompt forming. If there is an additional reference code pair, then operational flow returns to block 603. Otherwise, operational flow proceeds to block 613.

Figure 7:
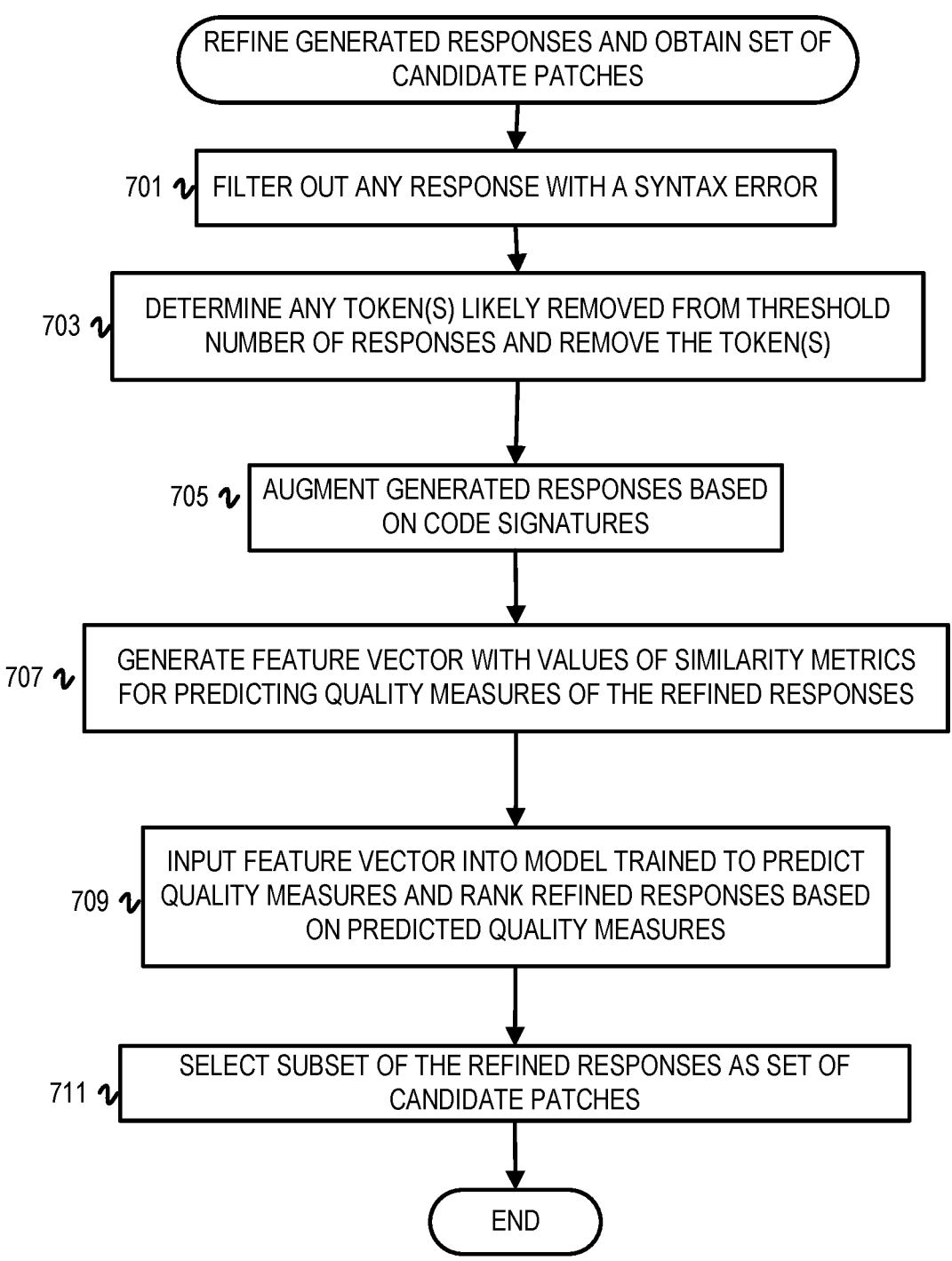
FIG. 7 is a flowchart of example operations for refining generated responses/code modifications and obtaining a candidate set of patches.

FIG. 7 is a flowchart of example operations for refining generated responses and obtaining a candidate set of patches. The responses generated from the code fix model from the batch of prompts will typically be greater than the candidate patches to present. Refinement reduces the generated responses to the amount to be presented and can increase quality. Refinement filters and/or augments the generated responses based on faulty responses and analysis of the responses as a group. Embodiments can also use the ranking model previously discussed to rank the responses by quality measure. The example operations of FIG. 7 presume the quality measure ranking is used in refining generated responses. Implementations can apply different operations for refinement based on preference between complexity of the processing and robustness/variety of the candidate patches to be presented. For instance, an implementation may only check for syntax errors.

At block 701, the pipeline filters out any response with a syntax error. The pipeline can use functionality of a development environment or standalone functionality (e.g., defined in a library) that checks for syntax errors. Implementations may correct the syntax error instead of eliminating the generated response.

At block 703, the pipeline analyzes the generated responses to determine tokens to remove based on absence of the token in a threshold number of similar responses. The pipeline can evaluate each token of each generated response with respect to the other generated responses. The pipeline calculates similarity (e.g., edit distance) between a currently selected generated response and each of the other generated responses. If more than a threshold number of those of the other generated response within a minimum edit distance do not include a token in the currently selected generated response, then the token is removed.

At block 705, the pipeline augments the generated responses based on code signatures. As mentioned previously, a code signature can be generated to indicate structure of a code fragment. The pipeline can generate structural code signatures (also referred to as code structure signatures) of the generated response. If a set of generated responses have a same or substantially similar structural code signature (e.g., within a defined margin of edit distance), the pipeline can modify one of the responses. The modification can be based on a set of modification heuristics for the code structure. For instance, each of a set of structural signatures can have a specified modification(s) to yield a more heterogeneous set of candidate patches. These can be manually curated and updated periodically. The generated responses can also be augmented with derivatives of responses. For example, the pipeline can search a repository of curated patches indexed by structural signature and create a derivative response based on a curated patch with a similar structural signature.

At block 707, the pipeline generates a feature vector/matrix for predicting quality measures of the refined responses. For each of the refined responses, the pipeline calculates values for each of the metrics that constitute the features for a trained model to predict quality measures. As mentioned previously, the pipeline will pre-process the raw data (i.e., the prompt parts and generated responses) to calculate the metrics values. If the refined responses include a derivative response, it would be associated with the prompt corresponding to the source/parent response.

At block 709, the pipeline inputs the feature vector into the model that has been trained to predict quality measures. Based on the predicted quality measures, the model can rank the refined responses.

At block 711, the pipeline selects a subset of the refined responses based on the ranking as the set of candidate patches. Presumably, the m highest ranked of the refined responses are selected as candidate patches.

Variations

Many variations are possible with the disclosed embodiments. With respect to patch generation alone, the disclosed code fix model can be used to generate a single patch from a single prompt, multiple patches from a single prompt, a single patch from multiple prompts, and multiple patches from multiple prompts. The code fix model can be trained to generate responses in different formats, for example, it can be trained to generate unified diff patches directly. The disclosed model trained to predict quality measures of generated responses can be used for responses generated from a different type of LLM that accepts prompts as inputs other than that disclosed herein. The disclosed code fix model does not necessarily operate in conjunction with a prompt generator that chooses reference code pairs based on the disclosed ranking model for reference code pairs. Furthermore, embodiments are not limited to transformer-based LLMs. Embodiments can use any generative model that operates on text, such as a recurrent neural network (RNN) using long short-term memory (LSTM) or using gated recurrent units (GRU), variants of transformers (e.g., an attention free transformers), etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For instance, deduplication of string representations in FIG. 3 at block 305 may not be performed. As another example, the example operations represented by block 703, 705 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
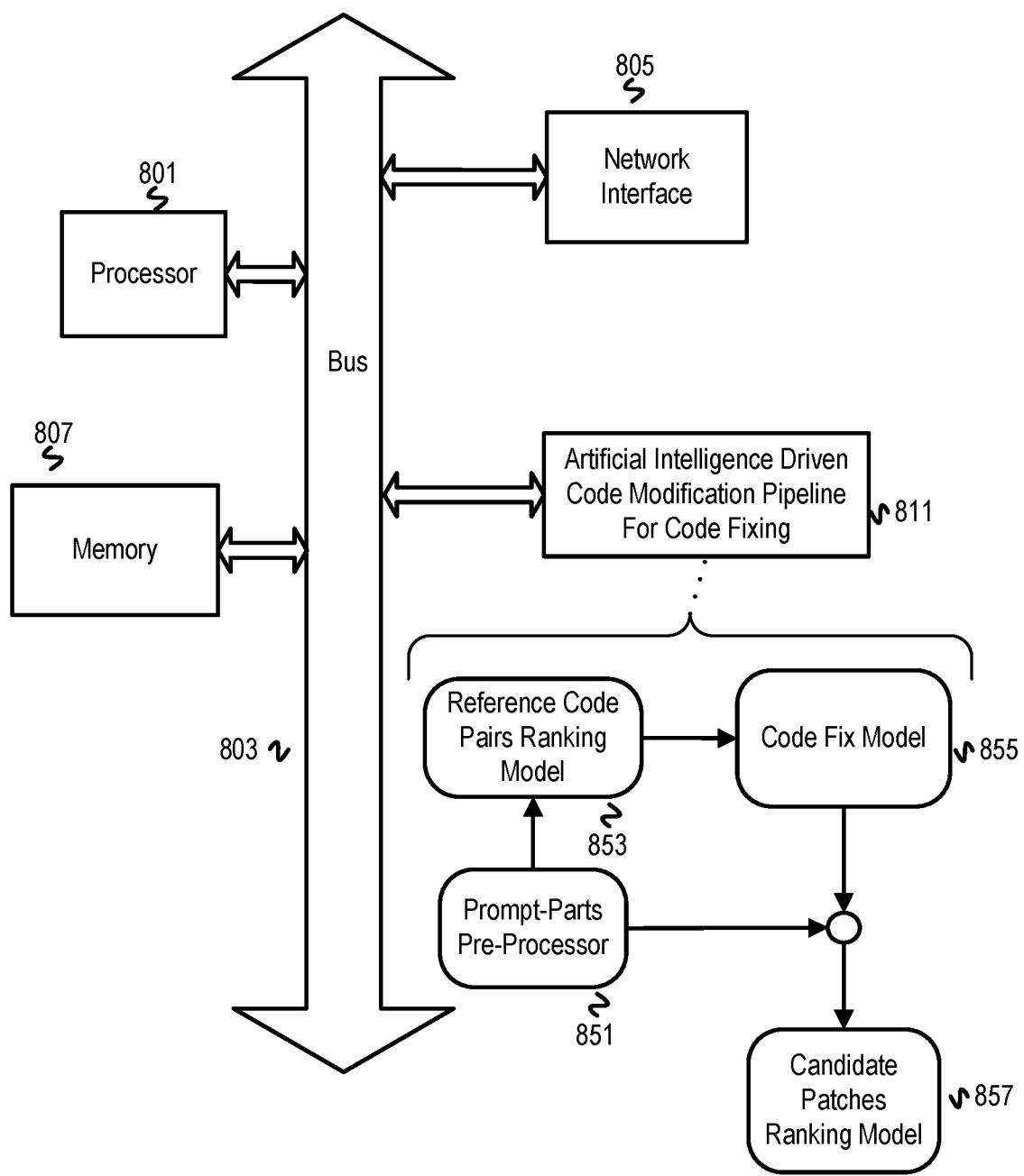
FIG. 8 depicts an example computer system with an AI driven code modification pipeline for code fixing.

FIG. 8 depicts an example computer system with an AI driven code modification pipeline for code fixing. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes a AI driven code modification pipeline 811 fine-tuned for generating code modifications to fix flaws. The pipeline 811 includes a LLM that has been fine-tuned as described earlier. The pipeline 811 generates prompts based on detected flaws and code reference pairs that guide the LLM on modifying the flawed code.

FIG. 8 depicts a few of the models and a pre-processor that could be part of the fix pipeline. Thus, the pipeline 811 may include an ensemble of the disclosed models. The pipeline 811 includes a prompt-parts pre-processor 851, a reference code pairs ranking model 853, a code fix model 855, and a candidate patches ranking model 857. The prompt-parts pre-processor 851 takes the prompt parts (e.g., code body, flawed code fragment, reference code pairs) and generates a matrix of feature values therefrom. The pre-processing can include decomposing the prompt into the parts, generating structural representations, generating abstract and/or detailed change signatures, and pairing the different parts to then calculate values of similarity metrics for generating feature values and populating the matrix. The pre-processor 851 can include the functionality for calculating edit distances and ratios of edit distances or include calls to externally defined functions. When being run for the reference code pairs ranking model 853, the prompt-parts pre-processor 851 would not perform the pre-processing corresponding to a generated response. This would be performed when the prompt-parts pre-processor 851 is run for the candidate patches ranking model. The reference code pairs ranking model 853 (e.g., a GBM or light GBM) has been trained to predict quality measures based on reference code pairs relevant to a flawed code fragment so that the predicted quality measures inform ranking formed prompts. The code fix model 855 will generate one or more responses per prompt as described earlier and output the generated response(s) to the candidate patches ranking model 857. As previously described, embodiments may refine the responses generated from the code fix model 855 prior to ranking. The candidate patches ranking model 857 will generate quality measures for the received responses based on the feature vector generated by the prompt-parts pre-processor 851 from the prompts corresponding to the responses received by the candidate patches ranking model 857. Although depicted as being hosted on a computer, some or all of the pipeline 811 can be hosted on one or more compute instances (e.g., servers and/or virtual machines). Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:
obtaining a plurality of code fragments generated from a generative artificial intelligence (AI) model, wherein the plurality of code fragments corresponds to a set of one or more prompts input into the generative AI model;

determining values of features for input to a machine learning model trained to predict values of generated code fragments, wherein the features are metrics of similarity among code fragments in the set of one or more prompts and the generated code fragments and the metrics of similarity measure at least one of similarity of code fragments and similarity of changes to code fragments and wherein the metrics of similarity correspond to at least two of ratios of lengths among parts of a prompt, ratio of lengths between a generated code fragment and a part of a corresponding prompt, ratio of edit distances between different parts of a prompt and between a part of a prompt and a corresponding generated code fragment, ratio of edit operations between different parts of a prompt and between a part of a prompt and a corresponding generated code fragment, and measure of correlation of positions of edits between different parts of a prompt; and ranking the generated code fragments based on the predicted values from the machine learning model.

2. The method of claim 1, wherein determining the values of features for input to the machine learning model comprises calculating, for each prompt, at least two of similarity of text of a code fragment in the prompt and text of a corresponding one of the generated code fragments, similarity of code structure between the code fragment in the prompt and the corresponding one of the generated code fragment, and similarity of lengths of the code fragment in the prompt and the corresponding one of the generated code fragment.

3. The method of claim 1, wherein determining the values of features for input to the machine learning model comprises calculating, for each prompt, at least two of similarity of textual changes between a pair of reference code fragments in the prompt and textual changes between a code fragment in the prompt and a corresponding one of the generated code fragments, similarity of structural changes between the pair of reference code fragments and structural changes between the code fragment in the prompt and the corresponding one of the generated code fragments, similarity of text of the code fragment in the prompt and a first of the pair of reference code fragments, similarity of text of a second of the pair of reference code fragments and the generated code fragment, similarity of code structure of the code fragment in the prompt and the first of the pair of reference code fragments, and similarity of code structure of the second of the pair of reference code fragments and the corresponding one of the generated code fragment.

4. The method of claim 1, further comprising, for each prompt, generating a code structure signature for each code fragment in the prompt and for the corresponding one of the generated code fragments, wherein determining the values of features is based, at least in part, on the code structure signatures.

5. The method of claim 4, wherein generating the code structure signature comprises generating a representation of a code fragment without variability of names.

6. The method of claim 4, wherein generating the code structure signature comprises generating a representation of a code fragment that replaces each identifier name with a representative token for identifiers and each variable name with a representative token for variables.

7. The method of claim 4, wherein determining the values of features based, at least in part, on the code structure signatures comprises calculating values for a subset of the similarity metrics of code fragments as represented by the code structure signatures.

8. The method of claim 1, wherein the machine learning model is an ensemble of weak prediction models.

9. The method of claim 1, wherein the machine learning model is one or more regression models.

10. The method of claim 1, wherein the generative AI model is a language model with a transformer architecture.

11. A non-transitory, machine-readable medium having program code stored thereon, the program code comprising instructions to:

obtain a plurality of code fragments generated from a generative artificial intelligence (AI) model, wherein the plurality of code fragments corresponds to a set of one or more prompts input into the generative AI model;

determine values of features for input to a machine learning model trained to predict values of the generated code fragments, wherein the features are metrics of similarity among the code fragments in the set of one or more prompts and the generated code fragments and the metrics of similarity measure at least one of similarity of code fragments and similarity of changes to code fragments and wherein the metrics of similarity correspond to at least two of ratios of lengths among parts of a prompt, ratio of lengths between a generated code fragment and a part of a corresponding prompt, ratio of edit distances between different parts of a prompt and between a part of a prompt and a corresponding generated code fragment, ratio of edit operations between different parts of a prompt and between a part of a prompt and a corresponding generated code fragment, and measure of correlation of positions of edits between different parts of a prompt; and rank the generated code fragments based on the predicted values output from the machine learning model.

12. The non-transitory, machine-readable medium of claim 11, wherein the instructions to determine the values of features for input to the machine learning model comprise instructions to calculate, for each prompt, at least two of similarity of text of a code fragment in the prompt and text of a corresponding one of the generated code fragments which corresponds to the prompt, similarity of code structure between the code fragment in the prompt and the corresponding one of the generated code fragments, similarity of lengths of the code fragment in the prompt and the corresponding one of the generated code fragment.

13. The non-transitory, machine-readable medium of claim 11, wherein the program code further has stored thereon instructions to, for each prompt, generate a code structure signature for each code fragment in the prompt and for the corresponding one of the generated code fragments, wherein the instructions to determine the values of features is based, at least in part, on the code structure signatures.

14. The non-transitory, machine-readable medium of claim 13, wherein the instructions to generate the code structure signature comprise instructions to generate a representation of a code fragment without variability of names.

15. The non-transitory, machine-readable medium of claim 13, wherein the instructions to generate the code structure signature comprise instructions to generate a representation of a code fragment that replaces each identifier name with a representative token for identifiers and each variable name with a representative token for variables.

16. The non-transitory, machine-readable medium of claim 13, wherein the instructions to determine the values of features based, at least in part, on the code structure signatures comprise instructions to calculate values for a subset of the similarity metrics of code fragments as represented by the code structure signatures.

17. The non-transitory, machine-readable medium of claim 11, wherein the machine learning model is an ensemble of weak prediction models.

18. The non-transitory, machine-readable medium of claim 11, wherein the machine learning model is one of a light gradient-boosting machine and a gradient-boosting machine.

19. The non-transitory, machine-readable medium of claim 11, wherein the generative AI model is a language model with a transformer architecture.

20. An apparatus comprising:

a processor; and a machine-readable medium having instructions stored thereon that are executable by the processor to cause the apparatus to:

create a training dataset with prompts, code fragments generated by a generative artificial intelligence (AI) model in response to the prompts, and expected code fragments for the prompts;

preprocess the training dataset, wherein the instructions to preprocess the training dataset comprise instructions to:

calculate a first set of values of similarity metrics between each of the expected code fragments and each of a corresponding subset of the generated code fragments;

for each of the generated code fragments, calculate a quality measurement based, at least in part, on the first set of values of similarity metrics of the generated code fragment and the corresponding expected code fragment; and for each of the prompts, calculate a second set of values of similarity metrics among parts of the prompt and a subset of the generated code fragments generated responsive to the prompt; and train a machine learning model to predict quality measurements for generated code fragments based on the second set of values as inputs and the calculated quality measurements as targets.

21. The apparatus of claim 20, wherein the machine-readable medium further has stored thereon instructions executable by the processor to cause the apparatus to, for each prompt, populate a feature vector with the second set of values calculated for the prompt.

22. The apparatus of claim 20, wherein the instructions to train the machine learning model comprise the instructions being executable by the processor to cause the apparatus to also train the machine learning model to rank, for each prompt, the subset of generated code fragments corresponding to the prompt based on the predicted quality measurements of the subset of generated code fragments.

23. The apparatus of claim 20, wherein the machine-readable medium further has stored thereon instructions executable by the processor to cause the apparatus to:

generate code structure signatures for the generated code fragments and the expected code fragments, wherein a code structure signature expresses structure of a code fragment without naming variability, wherein the instructions to calculate the first set of values of similarity metrics comprise the instructions being executable by the processor to cause the apparatus to calculate at least a subset of the first set of values of similarity metrics based, at least in part, on the code structure signatures.

* * * * *